US009418144B2

(12) United States Patent
Sperling et al.

(10) Patent No.: US 9,418,144 B2
(45) Date of Patent: Aug. 16, 2016

(54) SIMILAR DOCUMENT DETECTION AND ELECTRONIC DISCOVERY

(71) Applicant: Stroz Friedberg, LLC, New York, NY (US)

(72) Inventors: Michael Sperling, Lawrence, NY (US); Rong Jin, East Lansing, MI (US); Illya Rayvych, Far Rockaway, NY (US); Jianghong Li, Jericho, NY (US); Jinfeng Yi, East Lansing, MI (US)

(73) Assignee: STROZ FRIEDBERG, LLC, New York, NY (US)

( * ) Notice: Subject to any disclaimer, the term of this patent is extended or adjusted under 35 U.S.C. 154(b) by 0 days.

(21) Appl. No.: 14/863,913

(22) Filed: Sep. 24, 2015

(65) Prior Publication Data

US 2016/0012061 A1 Jan. 14, 2016

Related U.S. Application Data

(63) Continuation of application No. 13/763,253, filed on Feb. 8, 2013, now Pat. No. 9,208,219.

(60) Provisional application No. 61/597,090, filed on Feb. 9, 2012.

(51) Int. Cl.
 *G06F 17/30* (2006.01)

(52) U.S. Cl.
 CPC ...... *G06F 17/3069* (2013.01); *G06F 17/30011* (2013.01); *G06F 17/30867* (2013.01)

(58) Field of Classification Search
 CPC .................................................. G06F 17/3069
 See application file for complete search history.

(56) References Cited

U.S. PATENT DOCUMENTS

| 2004/0162834 | A1* | 8/2004 | Aono ................ G06F 17/30675 |
| 2005/0165782 | A1* | 7/2005 | Yamamoto ........ G06F 17/30017 |
| 2010/0030780 | A1* | 2/2010 | Eshghi .............. G06F 17/30271 707/758 |

* cited by examiner

*Primary Examiner* — Grace Park
(74) *Attorney, Agent, or Firm* — GTC Law Group PC & Affiliates (57) ABSTRACT

Systems and methods are disclosed for performing duplicate document analyses to identify texturally identical or similar documents, which may be electronic documents stored within an electronic discovery platform. A process is described which includes representing each of the documents, including a target document, as a relatively large n-tuple vector and also as a relatively small m-tuple vector, performing a series of calculations on the set of m-tuple vectors to identify a set of documents which are candidate near-duplicates to the target document, and then filtering the candidate set of near-duplicate documents based upon the distance of their n-tuple vectors from the n-tuple vector of the target document.

20 Claims, 3 Drawing Sheets

SIMILAR DOCUMENT DETECTION AND ELECTRONIC DISCOVERY

CROSS-REFERENCE TO RELATED APPLICATIONS

This application is a continuation of U.S. patent application Ser. No. 13/763,253 filed Feb. 8, 2013. U.S. patent application Ser. No. 13/763,253 claims the benefit of U.S. Provisional Patent Application No. 61/597,090, titled "SIMILAR DOCUMENT DETECTION AND ELECTRONIC DISCOVERY" and filed Feb. 9, 2012. Each of the above applications is hereby incorporated by reference in its entirety.

BACKGROUND

1. Field

The methods and systems disclosed herein relate generally to e-discovery technology for electronically stored information (ESI) and particularly to methods and systems for analyzing and detecting electronic documentation bearing a similarity, match or duplication.

2. Description of the Related Art

For organizations around the world, electronic document analysis, retrieval, categorization and storage is a labor intensive and increasingly costly element of conducting business. For example, businesses involved in litigation are often called on to identify and produce information relevant to the litigation, a process which can be extremely time consuming and expensive. The parties may be required to review millions of electronic documents to determine relevance, privilege, issue coding, and the like. Typically this involves a substantial expense for the parties due to the time and effort required to review these electronic documents.

The review may involve manually sifting through electronic documents and classifying them as, for example, relevant or non-relevant to an issue based on the content of the documents. Existing methods and systems employ methods for automating the review process through techniques such as keyword matching and the like. While such techniques may assist in the process for determining relevance, they typically do not work reliably or efficiently for detecting texturally identical or similar electronic documents. Duplicate, or near-duplicate electronic documents may form between 25 and 50 percent of the total documents in a typical electronic documentation of a business enterprise's corpus. Thus, the typical electronic document review process involves significant duplication of effort due to the presence of such duplicate documents, and the computational and analytic burden produced by such electronic document redundancy may slow the processing time of an electronic discovery platform, resulting in unnecessary document review and higher costs.

Therefore, there exists a need for a system and method for enhancing the efficiency of the review process by implementing reliable and effective techniques for identifying texturally identical or similar electronic documents within an electronic discovery analytic platform.

SUMMARY

Illustrative embodiments disclosed herein are directed to a duplicate document analysis system and method for identifying texturally identical or similar electronic documents, within an electronic discovery analytic platform (eDiscovery Platform), such as electronic documents stored within a corporation's document storage platform. In exemplary embodiments, the eDiscovery Platform may enable the detection of duplicate, or near duplicate, electronic documents, the detection of which may be used to efficiently find a subset of documents within a large collection that are textually similar to a given query document of interest. The eDiscovery Platform may utilize techniques for similar document detection based at least in part on a lightweight representation of documents that may be efficiently extracted from document texts.

In an embodiment, duplicate, or near-duplicate, document detection may be expressed as a sequence of one-dimensional range searches that may be efficiently implemented using bi-section search. The results of the duplicate document analysis may enable the classification and/or grouping of electronic documents identified as duplicates or near-duplicates, and present the results of such analysis to a user within a graphic user interface depicting the degree of similarity between electronic documents, and/or electronic documents and a target, reference electronic document. Accordingly, the duplicate document analysis methods and systems disclosed herein may provide for grouping and folderizing electronic documents based at least in part on the results of the duplicate document analysis.

The systems and methods disclosed herein may include a storage medium having stored instructions which, when executed by a processor, cause the processor to perform actions with regard to a first dataset having a plurality of first dataset elements and which is operably accessible to the processor, each of the first dataset elements corresponding to a different document and each of the documents having one or more characteristics. The systems and methods may include the processor performing several actions, such as first creating an n-tuple vector for each of a selected number of the first dataset element of the plurality of first dataset elements wherein each component of the n-tuple vector correlates to a characteristic of the relevant first dataset element. The systems and methods may additionally include the performance of actions such as creating an m-tuple vector for each of two or more of the n-tuple vectors, wherein each of the m-tuple vectors includes as its components (a) the norm of its corresponding n-tuple vector, (b) the component sum of its corresponding n-tuple vector, and (c) a set of random projections of its corresponding n-tuple vector. The systems and methods may also include performance of actions such as selecting one of the dataset elements to be a target. The systems and methods may include performance of actions such as selecting the m-tuple vector that corresponds to the target and at least one other of the m-tuple vectors as elements of a first candidate set. Additionally, the systems and methods may include performance of actions such as performing a series of one-dimensional range searches starting with the first candidate set to create a second candidate set comprising one or more of the m-tuple vectors of the first candidate set. The series of one-dimensional range searches may be performed bisectionally. The systems and methods may include performing additional actions, such as determining for each of the n-tuple vectors which corresponds to one of the m-tuple vectors of the second candidate set its distance from the target's n-tuple vector. Furthermore, the systems and methods may include actions such as creating a second dataset comprising each of the first dataset elements that has a corresponding n-tuple vector which is within a selected distance from the target's n-tuple vector. The systems and methods disclosed herein may further include a storage medium wherein at least one of the random projections is created using a vector of Rademacher random variables. The systems and methods disclosed herein may further include a storage medium wherein at least one of the random projection is created using a vector randomly sampled from a Gaussian distribution. The methods and systems described herein may further comprise a storage medium wherein at least some of the documents comprise one or more English language characters and each of the n-tuple vectors comprises sixty-two components. The systems and methods disclosed herein may further include a storage medium wherein the number of random projections is selected from the range of integers from two through two hundred seventy. The systems and methods disclosed herein may further include a storage medium wherein the number of random projections is selected from the range of integers from six through twenty. The systems and methods disclosed herein may further include a storage medium, wherein the number of random projections is eight. The systems and methods disclosed herein may further include a storage medium wherein the actions further comprise ranking each of the second dataset elements relative to its distance from the target's n-tuple vector. The systems and methods disclosed herein may further include a storage medium wherein the ranking is in descending order of distance. The systems and methods disclosed herein may further include a storage medium wherein the number of one-dimensional range searches equals m. The systems and methods disclosed herein may further include a storage medium wherein the actions further comprise selecting one of the one-dimensional searches to be based upon the norm of the target's m-tuple vector. The systems and methods disclosed herein may further include a storage medium wherein the one-dimensional search that is based upon the norm of the target's m-tuple vector includes setting a threshold related to a factor multiplied by the norm of the target's m-tuple vector. The systems and methods disclosed herein may further include a storage medium wherein the factor is determined based upon the selected distance from the target's n-tuple vector, the norm of the target's n-tuple vector, and the maximum element in the target's n-tuple vector. The systems and methods disclosed herein may further include a storage medium wherein the actions further comprise selecting one of the one-dimensional searches to be based upon the component sum of the n-tuple vector which corresponds to the target. The systems and methods disclosed herein may further include a storage medium wherein the one-dimensional search that is based upon the component sum of the n-tuple vector which corresponds to the target includes setting a threshold related to a factor multiplied by the component sum of the n-tuple vector which corresponds to the target. The systems and methods disclosed herein may further include a storage medium wherein selecting at least one of the one-dimensional searches to be based upon a selected one of the components of the target's m-tuple vector that is within the set of the random projections of the target's corresponding n-tuple vector. The systems and methods disclosed herein may further include a storage medium wherein selecting at least one of the one-dimensional searches to be based upon a selected one of the components of the target's m-tuple vector that is within the set of the random projections of the target's corresponding n-tuple vector includes setting a threshold related to a factor multiplied by the selected component of the target's m-tuple vector that is within the set of the random projections of the target's corresponding n-tuple vector. It is to be noted that the series of one dimensional searches may be done bisectionally or otherwise, including using no winnowing of the dataset upon which a one dimensional search is based from one dimensional search to the next. The systems and methods disclosed herein may further include a storage medium wherein the actions further comprise displaying the target in conjunction with one or more identifiers, wherein each of the identifiers corresponds to one of the second dataset elements. The systems and methods disclosed herein may further include a storage medium wherein the actions further comprise displaying the target in conjunction with the document which corresponds to one of the second database elements. The systems and methods disclosed herein may further include a storage medium wherein the actions further comprise displaying the target in conjunction with the document which corresponds to one of the second database elements within four seconds of the selection of the target. The systems and methods disclosed herein may further include a storage medium wherein the actions further comprise determining the differences between the target and the document which corresponds to one of the second database elements and displaying those differences.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

While described herein with reference to various embodiments, it is understood that, in all cases, unless otherwise specified, references to an "embodiment" or "embodiments" refer to one or more exemplary and non-limiting embodiments. Also, it is understood that, in all descriptions herein, unless otherwise specified, even when not explicitly being referenced to an "embodiment" or "embodiments" refer to one or more exemplary and non-limiting embodiments.

DETAILED DESCRIPTION

A duplicate document analysis system and method is provided for analyzing electronically stored information (ESI), such as electronic documents within a corporation or other organization. ESI comprises electronic documents including emails, contracts, invoices and the like that may be stored in an electronic form on a plurality of client devices including home or office computers, mobile phones, personal digitals assistants (PDAs), disk drives, email archives in home directories or backup systems, distributed or cloud computing environments, or some other platform enabled to store electronic documentation. Electronic documents may be accessed from a hosted database, or other data storage facility, through an eDiscovery Platform, as described herein. The eDiscovery Platform may enable users to process, host, analyze and review data and documentation through a customizable GUI for document review and recall. Further the eDiscovery Platform may include functionalities including, but not limited to, audit and project management tools, communication tools including instant messaging and searchable blogs, autocoding and bulk tagging of electronic documents, managing document access privileges for users, recording and audit of usage history, foreign language processing and document translation options, and the identification of duplicate and near-duplicate documents and redaction options. The eDiscovery Platform may also enable intelligent document filtering that a user may activate to classify and group electronic documents, including grouping documents based on the degree of similarity, match and/or duplication inherent in documents as derived from using the duplicate document analysis system and methods, as described herein.

The present invention illustrates methods and systems for duplicate document analysis which may be used to efficiently find a subset of documents within a large collection that are textually similar to a given query document. In an example, duplicate document analysis may be used in electronic discovery of documents as part of the eDiscovery Platform, as described herein. In an example, duplicate document analysis may also be used in other applications of electronic document analysis including, but not limited to, web crawlers, data extraction, plagiarism detection, spam detection, or some other form of electronic document processing. In accordance with the invention, the eDiscovery Platform may enable a module to identify documents that are duplicates or near-duplicates, meaning that they are exact textual matches or substantially similar textual matches. The duplicate document analysis module of the eDiscovery Platform may represent a first document based at least in part on the presence of character and numeral frequency within the document. These document attributes may then be compared with a plurality of documents to determine a probability that each of the plurality of documents is a duplicate of the first document. The duplicate document analysis module may generate a 'similarity score' depicting the degree of similarity between any two documents and utilize a threshold to label the documents as duplicates or near-duplicates, including a predefined threshold set by a user of the eDiscovery Platform. In an example, a user may set a threshold whereby any two documents with a similarity score of greater than 95% may be defined as duplicates while two documents with a similarity score of between 85 and 95% may be defined as near-duplicates, and documents with a similarity score of <85% defined as dissimilar or non-duplicative. The results of the duplicate document analysis may be used to cull documents from a corpus of electronic documents, and exclude documents not meeting a desired similarity threshold from further analysis, thereby reduce the overall number of documents that must be analyzed and reducing the human and computational burden of subsequent document analysis to be performed by the eDiscovery Platform.

Electronic discovery of documents often requires document reviewers to quickly inspect thousands of documents. Identification of textually identical or similar documents must be presented to users very quickly so they can work efficiently. Thus, a constraint on effective duplicate document analysis is that it must be capable of efficiently reviewing and identifying duplicate, or near-duplicate, documents in real-time. In order to satisfy this speed requirement, one technique for similar document detection in electronic discovery uses pre-built clusters to group similar documents around a centroid. However, this approach can have a number of drawbacks, such as, the threshold for "similarity" cannot be changed dynamically when similarity clusters are pre-built using a similarity threshold. Depending on their requirements, users may want to dynamically relax or tighten the criteria for document similarity. Due to the large number and variety of documents in a typical document corpus, it is usually too difficult to construct well-separated clusters. Thus, it is possible that documents in adjacent clusters are more similar to each other than to their respective centroids. The challenge to creating well-separated clusters is exacerbated by the fact that the entire document corpus may not arrive at once, but usually arrives in multiple deliveries, resulting in iterative document analysis within the eDiscovery Platform. One approach to overcoming the problems resulting from this serial delivery of documents in need of duplicate document analysis is to separately cluster each batch delivery of documents. However, this approach has the drawback that similar documents may not be identified across the batch deliveries. Another approach to overcoming the problems resulting from this serial delivery of documents in need of duplicate document analysis is to merge newly received documents into an existing cluster structure by scanning existing centroids for an eligible cluster. However, this approach may lead to degradation of cluster quality and instances of documents in adjacent clusters being more similar to each other than to their respective centroids. In the example of the present invention, the duplicate document analysis methods and systems, as described herein, may be used to identify similar documents dynamically without pre-built clusters, even when a corpus contains millions of electronic documents. Further, according to the duplicate document analysis methods and systems of the present invention, reviewers using the eDiscovery Platform may vary the similarity threshold at will, and in real time, thus retrieving more or less similar document populations depending on the analytic needs of the eDiscovery Platform user.

In embodiments, the nature of electronic document populations that are typically included in an electronic discovery analysis may be characterized using a plurality of metrices which may include (i) a size metric, where size describes a document corpus that may range from hundreds of thousands to hundreds of millions documents, (ii) a schedule metric, where the schedule may describe the timing of a serial batch delivery of electronic documents which cannot be made available as a single corpus (documents may arrive in waves over a period of months or years), and/or (iii) a diversity metric, where diversity may describe that the documents in any single grouping may range from email advertisements to highly technical manuals, including a plurality of languages, or exhibit some other type of diversity. Further, electronic document groupings arriving at different times may contain completely different subject matter.

Figure 1:
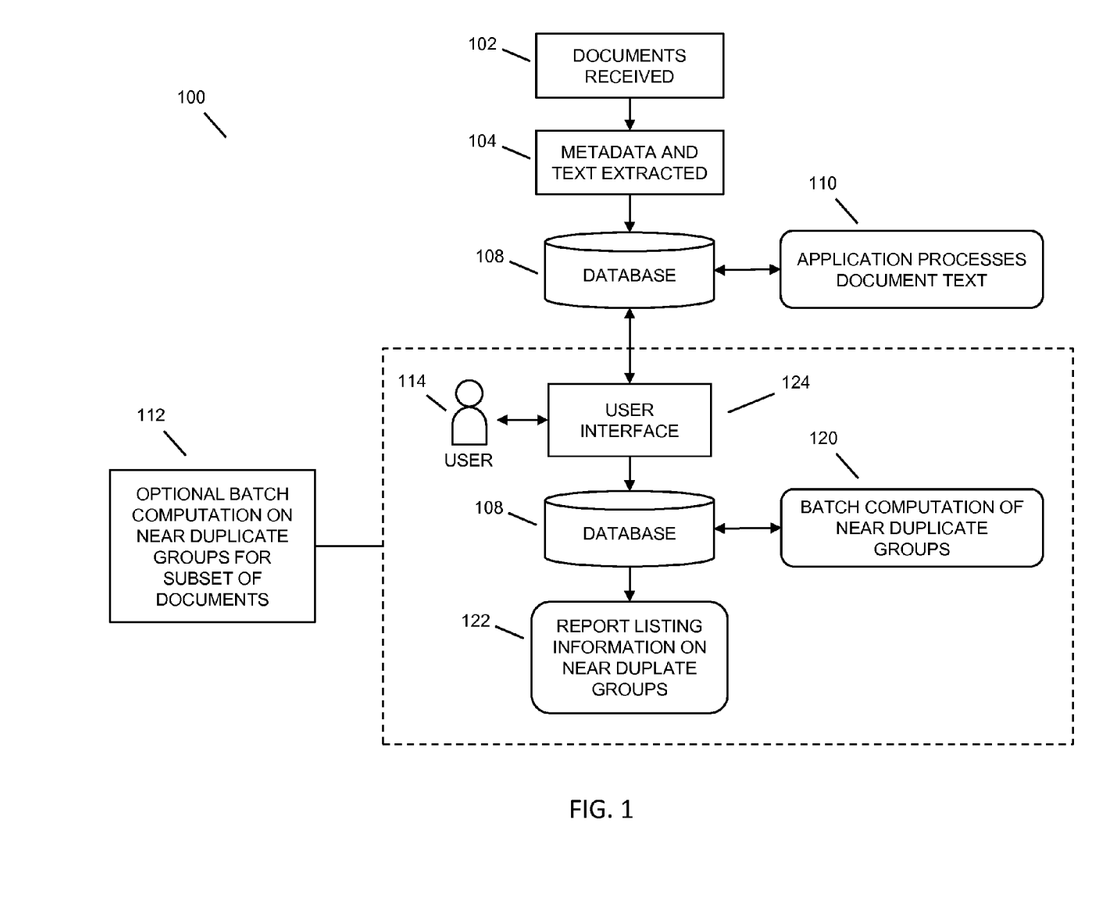
FIG. 1 depicts an example embodiment of utilizing the methods and systems of the present invention for duplicate document analysis.

Referring to FIG. 1, in an example usage of the duplicate document analysis, as described herein, documents 102 (such as documents within a corporation or other organization) may be received or selected for analysis. From the documents, metadata, text 104 or other information relating to the documents may be extracted and stored within a database 108. The duplicate document analysis methods and systems may be used to process text 110 located within the documents. This text may be stored within the database. The duplicate document analysis methods and systems may be used to compute a "lightweight" vector representation of the documents and to create and store within the database 108 a high-dimensionality vector representing each document received 102. "Lightweight," as used herein, refers to a data representation that may be generated quickly, relative to more data-rich representations requiring a large amount of data to define a representation, and which uses a minimum of computation system resources (e.g., CPU, memory, and the like), and may be stored using a relatively small amount of storage capacity to be efficiently used in computation. In an example, the high-dimensionality representation of a document may be expressed as an n-tuple representation, for example a 62-tuple representation that is based at least in part on alphanumeric characters located within each document. Duplicate documentation analysis may then be used to compute a sum of vector components, vector lengths and random projections in order to create a low-dimensional vector, herein referred to as an m-tuple vector, and to write and store it in the database 108. In an example, the low-dimensionality, m-tuple, representation of a document may be expressed as a 10-tuple representation that is based at least in part on random projections using the high-dimensionality representation of a document. Continuing the example, a user 114 may select a document or plurality of documents for the purpose of detecting similar documents or document groups within a document corpus. A graphic user interface 124 may display documents for the user to select, and may save the user selection back to database 108. In embodiments, the user selections may be stored in a database separate from the database in which the metadata, text, or other information extracted from the documents is stored. Following selection by the user 114, the duplicate document analysis may perform a batch computation of near duplicate groups 120 for the documents, or for a subset of documents that are near duplicates of a reference document 112, wherein the documents within each near duplicate group bear a similarity to each other based at least on alpha-numeric characters located within each document. A report 122 may be generated as part of the duplicate document analysis, where the report 122 lists data regarding each of the plurality of near duplicate groups that may be identified by the computation, including but not limited to a document identifier, document title, document source, quantitative similarity to a reference document, or some other type of data associated within the documents of a near duplicate group that is identified by the computation.

Figure 2:
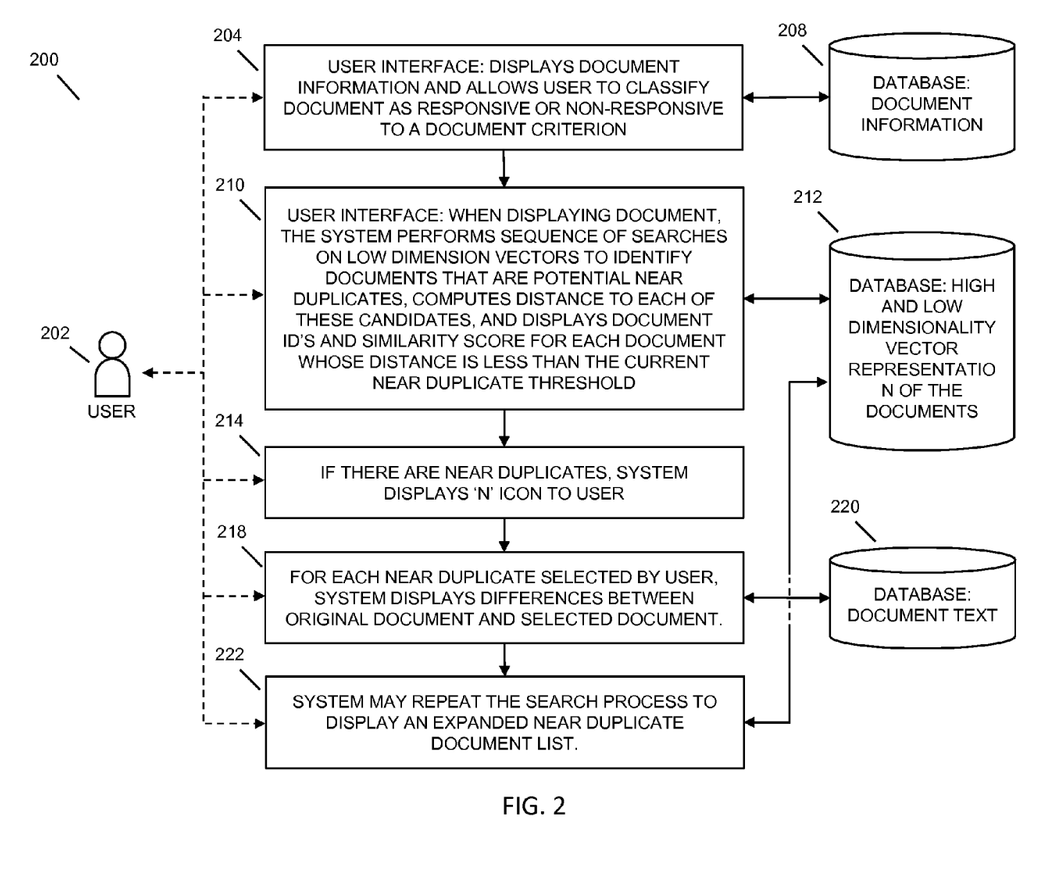
FIG. 2 depicts an example embodiment of a user interacting with an eDiscovery Platform that is utilizing the methods and systems of the present invention for duplicate document analysis.
Figure 3:
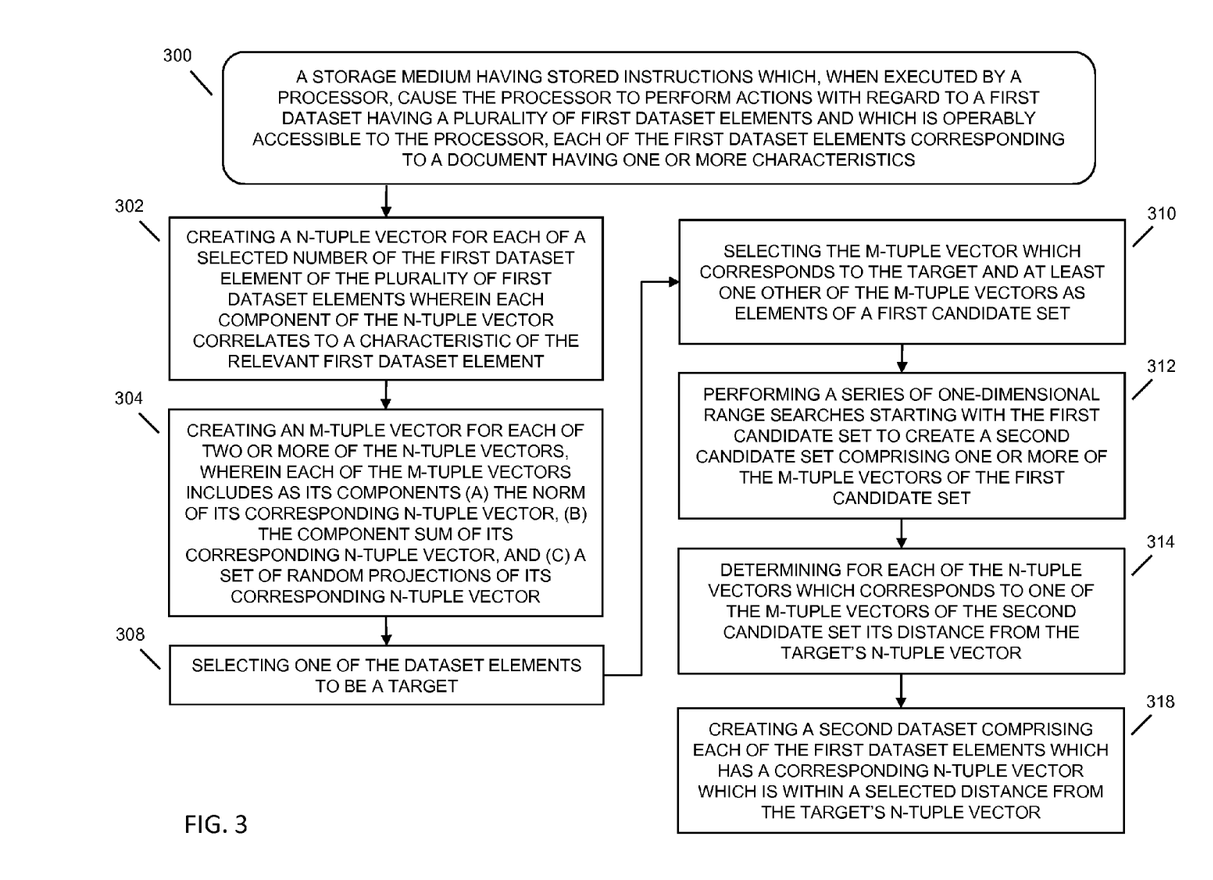
FIG. 3 depicts an example embodiment of calculating the similarity of a first set of data elements associated with a first document to a second set of data elements associated with a second document.

Referring to FIG. 2, in an example usage of the duplicate document analysis method and system, a user interlace may display document information and enable a user 202 to classify documents as to whether or not the documents are responsive or non-responsive to a document criterion 204, such as a datum within a reference document. The datum within the reference document may be stored within a database 208 containing a plurality of data associated with the document. This database 208 may also include data associated with documents other than the reference document. The user may review the reference document within the user interface and as the document displays and/or as part of the reference document being selected for viewing by the user 202, the duplicate documentation analysis system may perform a sequence of searches on low-dimension, including but not limited to bisectional searches, m-tuple, vectors, as described herein, to identify candidate documents that are potential near duplicates 210. A quantitative distance may be computed to express the degree of similarity between the reference document and each of these candidate documents. The user interface may display a document identifier and similarity score for each candidate document whose quantitative distance is less than a document similarity threshold that is used to determine which of the candidate documents is a near duplicate of the reference document. Continuing the example, as part of computing the quantitative distance between the reference document and the candidate documents, a database containing high-dimensionality, n-tuple, vector representations and low-dimensionality, m-tuple, vector representations of the reference and candidate documents 212 may be accessed and used to compute the quantitative distance. If there are near duplicates of the reference document within the candidate documents, the duplicate document analysis system may display to the user 202 an icon, such as an icon displaying "N" for "near duplicate documents," 214 that the user may engage to see a list of the candidate documents that are near duplicates of the reference document. The user 202 may select from among the near duplicate documents which to display, and the user interface may present to the user the differences between the reference document and selected near duplicate document(s) 218. The documents' text that is displayed within the user interface may be stored in a database 220, or plurality of databases 208, 220, that may be associated with the eDiscovery Platform. In an embodiment, the user 202 may increase or decrease the quantitative similarity threshold to see additional documents that are less or more similar to the reference document, respectively. The duplicate document analysis system may repeat the search process for identifying documents from among the candidate documents that are similar to the reference document and display an expanded near duplicate document list of candidate documents based on additional similarity thresholds set by the user within the user interface.

The methods and systems of the present invention may be divided into two stages. The first stage is to represent the content of documents by a vector. Given the vector representation of documents, the second stage is to map the vector representation to a low dimensional space to perform efficient search. Current methods of duplicate document detection may require a "heavy" representation of documents in that the representation of the documents is data-rich with numerous data elements that must be included in computation, which reduces computational efficiency and increases system resources required. This may lead to high cost in terms of both computation and storage space. A popular current representation technique for similar document detection is n-grams (i.e., n-consecutive words, which is also referred to as shingles). In this representation, the content of a document is represented by a binary vector. The size of the binary vector is the number of unique n-grams, with each entry of the vector indicating if a given n-gram appears in the document. Besides the n-consecutive words, both n-consecutive characters and sentences can also be used for similar document detection. In order to differentiate dissimilar documents, n must be made sufficiently large, making it computationally expensive to extract the n-gram features. In an example, a representation for similar document detection can be based on the classical vector space model. In this representation, each document can be represented by a vector of word histograms weighted by a tf.idf (term frequency-inverse document frequency) scheme. In an example, the vector space model can be extended from words to phrases in order to improve the detection accuracy. Both n-gram and vector space models represent documents by long vectors, requiring a high level of computation and storage space. Although hashing methods can be applied to reduce the size of document representation, and thus improve detection efficiency, extracting both vector representations for a large collection of documents can be computationally expensive.

In accordance with the invention, the eDiscovery Platform employs systems and methods of duplicate document analysis that includes a lightweight representation of documents, in which the content of each document is based, at least in part, on the counts of characters and numbers, resulting in a smaller data set that is required to represent the documents. In an example, the approach may represent each document by a vector of 62 dimensions, including 52 dimensions for both lower and upper case latin characters and 10 dimensions for digits. To detect the documents similar to a given target, or reference document $d_q$, a range search algorithm is applied to efficiently identify the subset of documents whose vector representations are within a given range of the vector representation of $d_q$. This lightweight vector representation of documents is efficient both computationally and in terms of required storage. Further, the approach allows a user to specify the degree of allowed dissimilarity in the duplicate document analysis by enabling the user to vary the threshold of a range search. Given a query q and a distance threshold r, range search aims to efficiently identify the subset of data points from a database that are within a distance r from q. When data points are represented by low dimensional vectors, a number of efficient solutions, based on pre-built index structures, may be used (e.g., KD-tree or R-tree). However, when the dimensionality is high, none of these approaches is efficient. The duplicate document analysis methods and systems of the present invention address the general problem of range search where the threshold r is a variable that will be determined by a user of the eDiscovery Platform.

In an embodiment of the duplicate document analysis systems and methods disclosed herein, a storage medium having stored instructions which, when executed by a processor, may cause the processor to perform actions with regard to a first dataset having a plurality of first dataset elements and which is operably accessible to the processor, each of the first dataset elements corresponding to a different document and each of the documents having one or more characteristics. The processor may perform several actions, such as first creating an n-tuple vector for each of a selected number of the first dataset element of the plurality of first dataset elements wherein each component of the n-tuple vector correlates to a characteristic of the relevant first dataset element. An m-tuple vector may be created for each of two or more of the n-tuple vectors, wherein each of the m-tuple vectors includes as its components (a) the norm of its corresponding n-tuple vector, (b) the component sum of its corresponding n-tuple vector, and (c) a set of random projections of its corresponding n-tuple vector. One of the dataset elements may be selected to be a target. The m-tuple vector that corresponds to the target and at least one other of the m-tuple vectors may be selected as elements of a first candidate set, and a series of one-dimensional range searches may be performed, starting with the first candidate set to create a second candidate set comprising one or more of the m-tuple vectors of the first candidate set. The series of one-dimensional range searches may be performed bisectionally. The distance from the target's n-tuple vector may be determined for each of the n-tuple vectors which corresponds to one of the m-tuple vectors of the second candidate set, and a second dataset may be created comprising each of the first dataset elements that has a corresponding n-tuple vector which is within a selected distance from the target's n-tuple vector.

The systems and methods disclosed herein may further include a storage medium wherein at least one of the random projections comprises a Rademacher random variable.

The systems and methods disclosed herein may further include a storage medium wherein at least one of the random projection comprises a Gaussian random variable.

The methods and systems described herein may further comprise a storage medium wherein at least some of the documents comprise one or more English language characters and each of the n-tuple vectors comprises sixty-two components.

The systems and methods disclosed herein may further include a storage medium wherein the number of random projections is selected from the range of integers from two through two hundred seventy.

The systems and methods disclosed herein may further include a storage medium wherein the number of random projections is selected from the range of integers from six through twenty.

The systems and methods disclosed herein may further include a storage medium, wherein the number of random projections is eight.

The systems and methods disclosed herein may further include a storage medium wherein the actions further comprise ranking each of the second dataset elements relative to its distance from the target's n-tuple vector.

The systems and methods disclosed herein may further include a storage medium wherein the ranking is in descending order of distance.

The systems and methods disclosed herein may further include a storage medium wherein the number of one-dimensional range searches equals m.

The systems and methods disclosed herein may further include a storage medium wherein the actions further comprise selecting one of the one-dimensional searches to be based upon the norm of the target's m-tuple vector.

The systems and methods disclosed herein may further include a storage medium wherein the one-dimensional search that is based upon the norm of the target's m-tuple vector includes setting a threshold related to a factor multiplied by the norm of the target's m-tuple vector.

The systems and methods disclosed herein may further include a storage medium wherein the actions further comprise selecting one of the one-dimensional searches to be based upon the component sum of the n-tuple vector which corresponds to the target.

The systems and methods disclosed herein may further include a storage medium wherein the one-dimensional search that is based upon the component sum of the n-tuple vector which corresponds to the target includes setting a threshold related to a factor multiplied by the component sum of the n-tuple vector which corresponds to the target.

The systems and methods disclosed herein may further include a storage medium wherein the actions further comprise displaying the target in conjunction with one or more identifiers, wherein each of the identifiers corresponds to one of the second dataset elements.

The systems and methods disclosed herein may further include a storage medium wherein the actions further comprise displaying the target in conjunction with the document which corresponds to one of the second database elements.

The systems and methods disclosed herein may further include a storage medium wherein the actions further comprise displaying the target in conjunction with the document which corresponds to one of the second database elements within four seconds of the selection of the target.

The systems and methods disclosed herein may further include a storage medium wherein the actions further comprise determining the differences between the target and the document which corresponds to one of the second database elements and displaying those differences.

In embodiments, the duplicate document analysis may be based on random projection approaches that include converting a high dimensional range search problem into a low dimensional range search problem. The approaches may also include randomly projecting data points into a low dimensional space and then performing range search over the projected space using the conventional approaches, for example using a k-dimensional (KD) tree. These approaches may be based on the Johnson Lindenstrauss Theorem, which involves preserving the pairwise distance through random projection. Random projection can be applied to several applications, including anomaly detection, classification and clustering. In an example, a first limitation of range search may be described as: A collection of vectors (such as a database), D may be defined as, $D=\{x_1, \ldots, x_N\}$, where $x_i \in R^d$ and d1 is the dimension of the space.

Further, a query point, q, may be defined as, $q \in R^d$

The limitations of range search includes finding a subset of data points in D that are within a distance r from q, where r can be the range specified by a user.

In order to identify the solution of the problem, $D(r,q)$ may be defined as a subset of data points in D that are within distance r from the query q, that is to say, $$D(r,q) = \{x \in D : |x-q|_2 \le r\}$$

For example, let $m(r,q) = |D(r,q)|$ be the number of data points within the given range, and $A(r,q) = \max_{x \in D(r,q)} |x-q|_\infty$ be the maximum difference in any attributes between the query point and the data points within the given range. Evidently, it may be seen that $m(r,q) \le N$ and $A(r,q) \le r$. Further, it may be assumed that r is sufficiently small such that $m(r,q)$ has a weak dependence on N. In this example, it may be assumed that both the data points in D and the query q have bounded length, $|x|_2 \ge 1$, $\forall x \in D$ and $|q| \le 1$.

An algorithm may be used for identifying a solution to the specified problem, that uses efficient range search using gaussian random variables will now be described in detail. An input to the algorithm may be the vector (or database) D, defined as $D=\{x_1, \ldots, x_N\}$. Also r>0 can be defined as the specified range, $\tau \ge 1$ may be defined as the threshold factor, m may be defined as the number of one dimension range searches and q may be defined as the query point.

In an example, the algorithm may include offline processing which may include defining a random sample $U = (u_1, \ldots, u_m)$, where $u_k : N(0, I/d), k \in [m]$. $i=1, \ldots, N$, and computing.

$$z_i = x_i^T U$$

In an example, the algorithm may include online processing which can include computing the projection $z^q = (z_1^q, \ldots, z_m^q)^T = q^T U$ for query q k=1, 2, ..., m k=1, computing the set $D_1(r,q)$ as $$D_1(r,q) = \left\{i \in [N]: |z_{i,k} - z_k^q| \le \tau \frac{r}{\sqrt{d}}\right\},$$

updating the set $D_k(r,q)$ as $$D_k(r,q) = \left\{i \in D_{k-1}(r,q): |z_{i,k} - z_k^q| \le \tau \frac{r}{\sqrt{d}}\right\},$$

and outputting the set $D_m(r,q)$.

For the purpose of speeding up the search, an implementation of the algorithm may include converting a high dimensional range search into a sequence of one-dimensional range searches. More specifically, multiple vectors from a Gaussian distribution, denoted by $u_1, \ldots, u_m$ may be randomly sampled. For each randomly sampled vector $u_i$, both the query q and the data points in D along the direction of $u_i$ may be projected, and the subset of data points in D whose projections are within a certain threshold $\rho$ (not r, but dependent on r) of the query q, denoted by $D_i$ can be identified. To implement an efficient one dimensional range search, the projection of data points in D along the direction of $u_i$ may be ranked in a descending order and a bi-section search can be performed to find the subset of data points whose projections are within a given range. The intersection of the data points returned by all of the one dimensional range searches can then be used to form the final result, defined by $D(r,q) = \cap_{i=1}^m D_i$.

This algorithm that is used as part of the duplicate document analysis within the eDiscovery Platform may be based on a random projection. However, in contrast to existing approaches, the algorithm does not approximate the pairwise distance by random projection. Instead, it approximates the binary decision and determines whether a data point is within a certain range of a query, by a sequence of binary decisions based on one dimensional projections of both the data point and the query.

For experimental validation of the improved computational efficiencies and faster processing times of the duplicate document analysis methods and systems described herein, in an example usage of the duplicate document analysis algorithm, a dataset may be used consisting of 13,228,105 documents. The size of documents in this example's collection varies from 1 character to 51,034,295 characters, and the average document length is 12,521 characters. The documents included in this collection may be diverse, including an English dictionary, customer lists, recipes, parent teacher association meeting minutes, project management reports, contracts, and descriptions of clinical drug trials. To evaluate the performance of the duplicate document analysis method, the query documents may be randomly selected by randomly sampling 0.01% of documents in the collection that have more than 20 characters, which leads to 1,283 query documents. A validation for the lightweight vector representation may then be performed. To evaluate the effectiveness of the proposed vector representation for similar document detection, for each query document q, firstly the matched documents $\{x_i\}$ that satisfy the condition $$|x-q|_2 \le \gamma |q|_2,$$

where $\{x_i\}$ and q are the lightweight vector representations of documents and the query, respectively, may be identified. In an example, $\gamma$ can be set to 0.025. Further the distance threshold in the specified condition may be set to $\gamma |q|_2$, thus dependent on the length of the query document. This may be more appropriate than a constant threshold because the allowed difference between two similar documents should depend on the size of the documents. Given the matched documents found by the condition, then the similarity between the query document $d_q$ and each matched document d can be measured, based on the edit distance $dist(d_q, d)$ between their texts:

$$sim(d_q, d) = 1 - \frac{dist(d_q, d)}{\max(|d_q|, |d|)}$$

where $|d_q|$ and $|d|$ represents the number of characters in $d_q$ and d, respectively. It may be assumed that if the lightweight vector representation is sufficient for similar document detection, a high similarity between query documents and matched ones may be observed.

In an example, a distribution of similarity may average over 1,283 query documents. It can be observed that approximately 99% of matched documents found by the proposed vector representation have similarity $\ge 95\%$. To further validate the proposed vector representation for similar document detection, the coefficient $\gamma$ in the condition specified previously can be set to 0.05. It can be observed that close to 90% of the matched documents found have more than 90% similarity, indicating that the proposed lightweight vector representation is sufficient for similar document detection when the difference between similar documents is small.

In an example, the performance of the duplicate document analysis algorithm may use the threshold r set to be $r=\gamma|q|_2$. For parameter $\tau$ in the algorithm, $\tau=\tau_0$ can be set, with $m(r, q)=10$, $\delta=0.1$, and $C_1=C_2=1$. In an example, the data may be stored in a database (e.g., an Oracle database), and the algorithm implemented using, for example, the PL/SQL language. The random projections for all the documents in the collection may be pre-computed. The results for searching accuracy may be identified by first evaluating the performance of the proposed approach by precision and recall. Given a query document q, let $D(r,q)$ be the subset of the documents within the distance r from q, and $\widehat{D(r,q)}$ be the subset of documents returned by Algorithm 3. The precision and recall can be defined as $$Prec = \frac{|D(r,q) \cap \widehat{D(r,q)}|}{|\widehat{D(r,q)}|}, \text{Recall} = \frac{|D(r,q) \cap \widehat{D(r,q)}|}{|D(r,q)|}$$

In an example, the precision and recall curves may be observed while increasing the number of random projections. It can be observed that as the number of random projections is increased, the recall remains almost unchanged at 1, while the precision improves from less than 0.2% to almost 90%. To further validate the approach, $\gamma$ can be relaxed to 0.05 and the precision and recall curves can be depicted diagramatically. Consequently, a small decrease in recall and a significant improvement in precision can be observed as the number of random projections is increased, verifying the effectiveness for high dimensional range search provided that the difference between similar documents is specified to be small.

Results for searching efficiency may be presented to users for similar documents. In an example, a post procedure may be added to the documentation analysis algorithm algorithm that removes any returned document if its distance to the query document is larger than the given threshold. As a result, the runtime includes two components: the time to perform the range search using the algorithm, and the time used to check if each returned document is within distance $\gamma|q|_2$ from the query document q. It may be noted that by increasing the number of random projections, the precision may be improved and thus the time spent checking if the returned documents are within the given range of the query reduced, but at the price of increasing the time for performing the range search. However, setting the number of random projections to 8 may prove to be a good tradeoff between the two components of runtime. Example results for using 8 random projections are given in Table 1. Compared to the exhaustive search (the last column in Table 1), the time used to find the matched documents is reduced dramatically by the proposed algorithm.

TABLE 1

Running time (seconds) for the algorithm (using 8 random projections) and exhaustive search

| Time (second) | Alg. 3 | Alg. 3 + two filters | Two filters | Exhaustive search |
|---|---|---|---|---|
| $\gamma = 0.025$ | 2.57 | 0.48 | 2.93 | 5452.80 |
| $\gamma = 0.05$ | 4.00 | 0.95 | 11.43 | 5452.80 |

While the documentation analysis algorithm algorithm provides precision and recall, the average runtime to find similar documents can still be too long for real time response to reviewers. The document vector representations and random projections can be stored in a database, and the sequential range searches on the random projections may be accomplished via, for example, a SQL statement with a WHERE clause of the form $\cap_{1 \leq i \leq m}|(x-q)^T u_i| \leq \rho$. Due to constraints such as a database's indexing structure, the speed of this statement may be dependent on the number of documents that satisfy the first projection range. In an example test set, the average number of documents that satisfied the first projection range can be taken as 263,883 when $\gamma=0.025$ and 525,264 when $\gamma=0.05$, which may cause a significant delay in obtaining the similar document set. In another example, a heuristic to reduce the number of documents in the first projection range by first filtering on 2 additional one dimensional ranges can be introduced. The first one-dimensional filter returns the documents satisfying the condition $||x|_2-|q|_2| \leq \gamma|q|_2$ and the second filter returns the documents satisfying the condition $||x|_1-|q|_1| \leq \gamma|q|_2$. Introducing these filters may reduce the average number of documents satisfying the new first range search to 56,591 when $\gamma=0.025$ and to 113,739 when $\gamma=0.05$. While these filters may have poor precision on their own (Table 2), using them in conjunction with the algorithm may reduce the average runtime to, for example, less than 1 second (Table 1) with a small degradation in recall (Table 2).

TABLE 2

Precision and recall for the algorithm (using 8 random projections) with and without additional two one-dimensional filters

| $\gamma$ | | Alg. 3 | Alg. 3 + two filters | Two filters | KD-tree |
|---|---|---|---|---|---|
| *0.025 | Recall | 0.999 | 0.992 | 0.992 | 0.960 |
| | Prec | 0.912 | 0.956 | 0.021 | N/A |
| *0.05 | Recall | 0.981 | 0.949 | 0.964 | 0.940 |
| | Prec | 0.312 | 0.542 | 0.006 | N/A |

In an example, the documentation analysis algorithm algorithm may be compared to the randomized KD-tree for high dimensional range search. The FLANN library can be applied to construct a randomized KD-tree for the entire document collection where each document is represented by its 62 tuple vector. It takes over ten hours to construct the KD-tree, and the resulting index structure consumes roughly twice the storage space as the original data. The recall values of KD-tree are given in Table 2. It can be observed that the proposed approach, despite its simplicity, can perform slightly better than KD-tree in recall without incurring the additional storage and computational costs of KD-tree.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A non-transitory storage medium having stored instructions which, when executed by a processor, cause the processor to perform actions with regard to a dataset having a plurality of dataset elements and which is operably accessible to the processor, each of the dataset elements corresponding to a different document and each of the documents having one or more characteristics, the actions comprising:

creating an n-tuple feature vector for each dataset element of the plurality of dataset elements, wherein each component of the n-tuple feature vector correlates to a specific characteristic of the corresponding dataset element;

creating an m-tuple search vector for each dataset element, wherein m is less than n, and wherein each of the m-tuple search vectors includes as its components (a) the norm of its corresponding n-tuple feature vector, (b) the component sum of its corresponding n-tuple feature vector, and (c) a set of random projections of its corresponding n-tuple feature vector;

selecting one of the dataset elements of the plurality of dataset elements to be a target dataset element;

for each dataset element of a selected number of the plurality of dataset elements, determining a corresponding distance between its corresponding m-tuple search vector and the m-tuple search vector of the target dataset element;

forming a candidate set comprising those dataset elements of the selected number of the plurality of dataset elements that have a corresponding m-tuple search vector that is within a specified distance range of the m-tuple search vector of the target dataset element;

for each of the dataset elements in the candidate set, determining a corresponding distance between its corresponding n-tuple feature vector and the n-tuple feature vector of the target dataset element; and forming a filtered set of dataset elements comprising those dataset elements of the candidate set that have a corresponding n-tuple feature vector that is within a specified distance range of the n-tuple feature vector of the target dataset element.

2. The non-transitory storage medium of claim 1, wherein at least one of the random projections in the set of random projections comprises a Rademacher random variable.

3. The non-transitory storage medium of claim 1, wherein at least one of the random projections in the set of random projections comprises a Gaussian random variable.

4. The non-transitory storage medium of claim 1, wherein at least some of the documents corresponding to the dataset elements comprise one or more English language characters and each of the n-tuple feature vectors comprises sixty-two components.

5. The non-transitory storage medium of claim 1, wherein the number of random projections is selected from the range of integers from two through two hundred seventy.

6. The non-transitory storage medium of claim 1, wherein the number of random projections is selected from the range of integers from six through twenty.

7. The non-transitory storage medium of claim 1, wherein the number of random projections is eight.

8. The non-transitory storage medium of claim 1, wherein the actions further comprise ranking each of the dataset elements in the filtered set relative to its distance from the target's n-tuple feature vector.

9. The non-transitory storage medium of claim 8, wherein the ranking is in descending order of distance.

10. The non-transitory storage medium of claim 1, further wherein each m-tuple distance determination is performed as a series of m one-dimensional range searches.

11. The non-transitory storage medium of claim 10, wherein the actions further comprise selecting one of the one-dimensional searches to be based upon the norm of the m-tuple search vector of the target dataset element.

12. The non-transitory storage medium of claim 11, wherein the one-dimensional search that is based upon the norm of the target's m-tuple search vector includes setting a threshold related to a factor multiplied by the norm of the target's m-tuple search vector.

13. The non-transitory storage medium of claim 11, wherein the actions further comprise selecting one of the one-dimensional searches to be based upon the component sum of the n-tuple feature vector that corresponds to the target dataset element.

14. The non-transitory storage medium of claim 13, wherein the one-dimensional search that is based upon the component sum of the n-tuple feature vector which corresponds to the target dataset element includes setting a threshold related to a factor multiplied by the component sum of the n-tuple vector that corresponds to the target dataset element.

15. The non-transitory storage medium of claim 11, wherein the actions further comprise selecting at least one of the one-dimensional searches to be based upon a selected one of the components of the m-tuple search vector of the target dataset element that is within the set of the random projections of the target dataset element's corresponding n-tuple feature vector.

16. The non-transitory storage medium of claim 15, wherein the at least one one-dimensional search that is based upon the selected one of the components of the m-tuple search vector of the target dataset element that is within the set of the random projections of the target dataset element's corresponding n-tuple feature vector includes setting a threshold related to a factor multiplied by the selected component of the m-tuple search vector of the target dataset element that is within the set of the random projections of the target dataset element's corresponding n-tuple vector.

17. The non-transitory storage medium of claim 11, wherein the performing of the series of one dimensional searches includes bisectionally performing the series of one dimensional searches.

18. The non-transitory storage medium of claim 1, wherein the actions further comprise displaying the document corresponding to the target dataset element in conjunction with the document corresponding to any one of the dataset elements in the filtered set.

19. The non-transitory storage medium of claim 18, wherein the actions further comprise displaying the document corresponding to the target dataset element in conjunction with the document corresponding to any one of the dataset elements in the filtered set within four seconds of the selection of the target dataset element.

20. The non-transitory storage medium of claim 1, wherein the actions further comprise determining the differences between the document corresponding to the target dataset element and the document corresponding to any one of the database elements in the filtered set and displaying those differences.

* * * * *